United States Patent
Coley et al.

(10) Patent No.: US 8,345,391 B2
(45) Date of Patent: Jan. 1, 2013

(54) DC/DC CONVERTER OVERCURRENT PROTECTION

(75) Inventors: William Hall Coley, Cary, NC (US); Kurk David Matthews, Menlo Park, CA (US)

(73) Assignee: Linear Technology Corporation, Milpitas, CA (US)

( * ) Notice: Subject to any disclaimer, the term of this patent is extended or adjusted under 35 U.S.C. 154(b) by 315 days.

(21) Appl. No.: 12/883,876

(22) Filed: Sep. 16, 2010

(65) Prior Publication Data

US 2011/0063760 A1    Mar. 17, 2011

Related U.S. Application Data

(60) Provisional application No. 61/243,236, filed on Sep. 17, 2009.

(51) Int. Cl.
*H02H 9/08* (2006.01)
(52) U.S. Cl. .......................................... 361/18; 391/93.9
(58) Field of Classification Search .................... 361/18, 361/93.7–93.9, 111
See application file for complete search history.

(56) References Cited

U.S. PATENT DOCUMENTS

| 5,023,692 | A |  | 6/1991 | Wodarczyk et al. |
| 5,572,395 | A | * | 11/1996 | Rasums et al. ................... 361/58 |
| 5,831,466 | A | * | 11/1998 | Pulvirenti et al. ............ 327/309 |
| 6,288,883 | B1 | * | 9/2001 | Chen .............................. 361/58 |

FOREIGN PATENT DOCUMENTS

| DE | 199 59 718 | 2/2001 |
| JP | 9-308239 | 11/1997 |
| JP | 2006-025547 | 1/2006 |
| JP | 2008-206271 | 9/2008 |

OTHER PUBLICATIONS

European Opinion on the Patentability of the claimed subject matter, issued in European Patent Application No. 10009844,1-2007, dated Apr. 4, 2011.

* cited by examiner

*Primary Examiner* — Danny Nguyen
(74) *Attorney, Agent, or Firm* — McDermott Will & Emery LLP

(57) ABSTRACT

A DC/DC converter and a method protect a MOSFET driven by the converter from overcurrent conditions. No extra pins are required to sense the current, which saves IC package area and cost.

13 Claims, 4 Drawing Sheets

DC/DC CONVERTER OVERCURRENT PROTECTION

RELATED APPLICATION

This application relates to and claims priority from U.S. Provisional Patent Application No. 61/243,236 filed Sep. 17, 2009 in the name of and entitled DC/DC Converter Overcurrent Protection.

TECHNICAL FIELD

The present disclosure relates generally to DC/DC converters, and more particularly to a DC/DC converter provided with overcurrent protection.

BACKGROUND

DC/DC converters are widely used to step from an input voltage level to an output voltage level that may be higher or lower than the input voltage. These converters generally use pulse-width modulated MOSFET switches to convert one DC voltage to another with minimal power loss. Protecting the MOSFET switches and other circuit components from destructive overcurrent conditions is necessary to ensure reliable and safe operation.

PRIOR ART SOLUTIONS

DC/DC converters often include provisions for overcurrent protection. Often the DC/DC converter is provided in the form of an integrated chip, and is used to protect a transistor such as a MOSFET from overcurrent conditions. As an example, as shown in FIG. 1, a DC/DC converter 10 (only a portion of which is shown in FIG. 1 for ease of illustration and explanation) can be connected to a MOSFET 12 that requires overcurrent protection by connecting the gate of the MOSFET to the pin 16. In this case a solution to provide overcurrent protection also requires connecting at least one other external pin 18 of the converter 10 to a resistor 14, which in turn is connected in series with the source of the MOSFET 12. The current through the MOSFET 12 is measured by sensing the voltage across resistor 14. A comparator 20 of the converter is used to compare the sensed voltage across external resistor 14 to a fixed internal reference voltage $V_{OS}$. As long as the sensed voltage is less than $V_{OS}$ the converter 20 will continue to operate under the condition that the MOSFET 12 is operating within its current limit. However, should the current through the MOSFET 12 exceed the current limit, the voltage across resistor 14 will exceed the reference voltage $V_{OS}$ and the comparator will provide a leading edge of a pulse to the reset input R of the latch 22 so as to the cause the Q output of the latch to go low. The low output is applied to the AND gate so that the output of the gate will go low until the next cycle. The low output results in the output at pin 16 low so as to turn the MOSFET 12 off.

FIG. 2 shows the prior art approach is sensing the current through the resistor using two pins 18 and 24. Thus, in either arrangement of FIG. 1 or 2, if the voltage across the resistor exceeds the comparator threshold (Vos in FIG. 1) then the MOSFET 12 is turned off until the next cycle.

Single-ended sensing has the advantage of requiring one less pin; however, special care must be taken with the ground sense of the comparator to ensure signal integrity. That is, any difference between the ground on the bottom side of the sense resistor and the ground of the overcurrent comparator will appear as an offset that causes the overcurrent comparator to trip prematurely or, worse yet, not to trip when a true overcurrent event occurs. Both arrangements typically include a blanking circuit 26 so that both the single-ended and differential sense methods typically disable, or "Blank," the overcurrent comparator for a few hundred nanoseconds after turning on the MOSFET to avoid a false overcurrent trip due to noise.

Problems of this prior art approach include the need to provide one or two external pins dedicated solely to the implementation of overcurrent protection, which increases IC package size, package cost, and PCB area. Special care must be taken with signal routing, particularly in the single-ended sense configuration, since noise and unintended resistance in the current sense path may cause the overcurrent comparator to trip prematurely or not trip in an overcurrent condition. The overcurrent comparator input is limited to a specific common-mode voltage range, and can not be used at arbitrarily high or low voltages.

An arrangement that overcomes or substantially reduces the foregoing is therefore desirable.

SUMMARY

In accordance with one aspect of the teachings provided herein, a DC/DC converter is of a type that provides a pulse width modulated signal output signal to the gate of a MOSFET switch. The converter comprises: an output configured to be coupled to the gate of the MOSFET switch; and a control configured so as to sense a current generated at the output when the current through the MOSFET switch exceeds a first threshold level, and disabling the pulse width modulated output signal until the next cycle of the signal when the output current exceeds a second threshold level.

In accordance with another aspect of the teachings provided herein, a method is provided for protecting a MOSFET switch coupled to the pulse width modulated output of a DC/DC converter from an overcurrent condition. The method comprises: coupling the MOSFET switch to a sense resistor so that current flowing though the MOSFET switch also flows through the sense resistor; coupling a bipolar transistor to the MOSFET switch and sense resistor so that current through the sense resistor biases the bipolar transistor so that when the when the current through the sense resistor exceeds a first threshold level, the bipolar transistor turns on so as to draw current from the output of the DC/DC converter; and disabling the output of the DC/DC converter until the next cycle of the pulse width modulated output when the current drawn from the output of the DC/DC converter exceeds a second threshold level.

These, as well as other components, steps, features benefits, and advantages, will now become clear from a review of the following detailed description of illustrative embodiments, the accompanying drawings, and the claims.

GENERAL DESCRIPTION OF THE DRAWINGS

The drawings disclose illustrative embodiments. They do not set forth all embodiments. Other embodiments may be used in addition or instead. Details that may be apparent or unnecessary may be omitted to save space or for more effective illustration. Conversely, some embodiments may be practiced without all of the details that are disclosed. When the same numeral appears in different drawings, it refers to the same or like components or steps.

Aspects of the disclosure may be more fully understood from the following description when read together with the accompanying drawings, which are to be regarded as illustrative in nature, and not as limiting. The drawings are not necessarily to scale, emphasis instead being placed on the principles of the disclosure. In the drawings.

Figure 5:
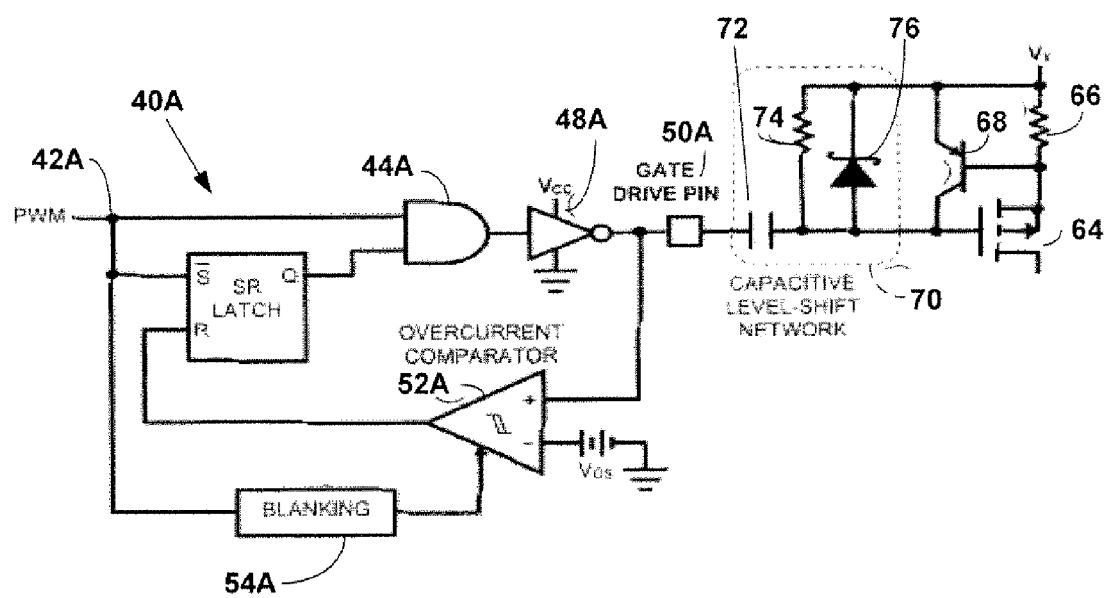
Figure 6:
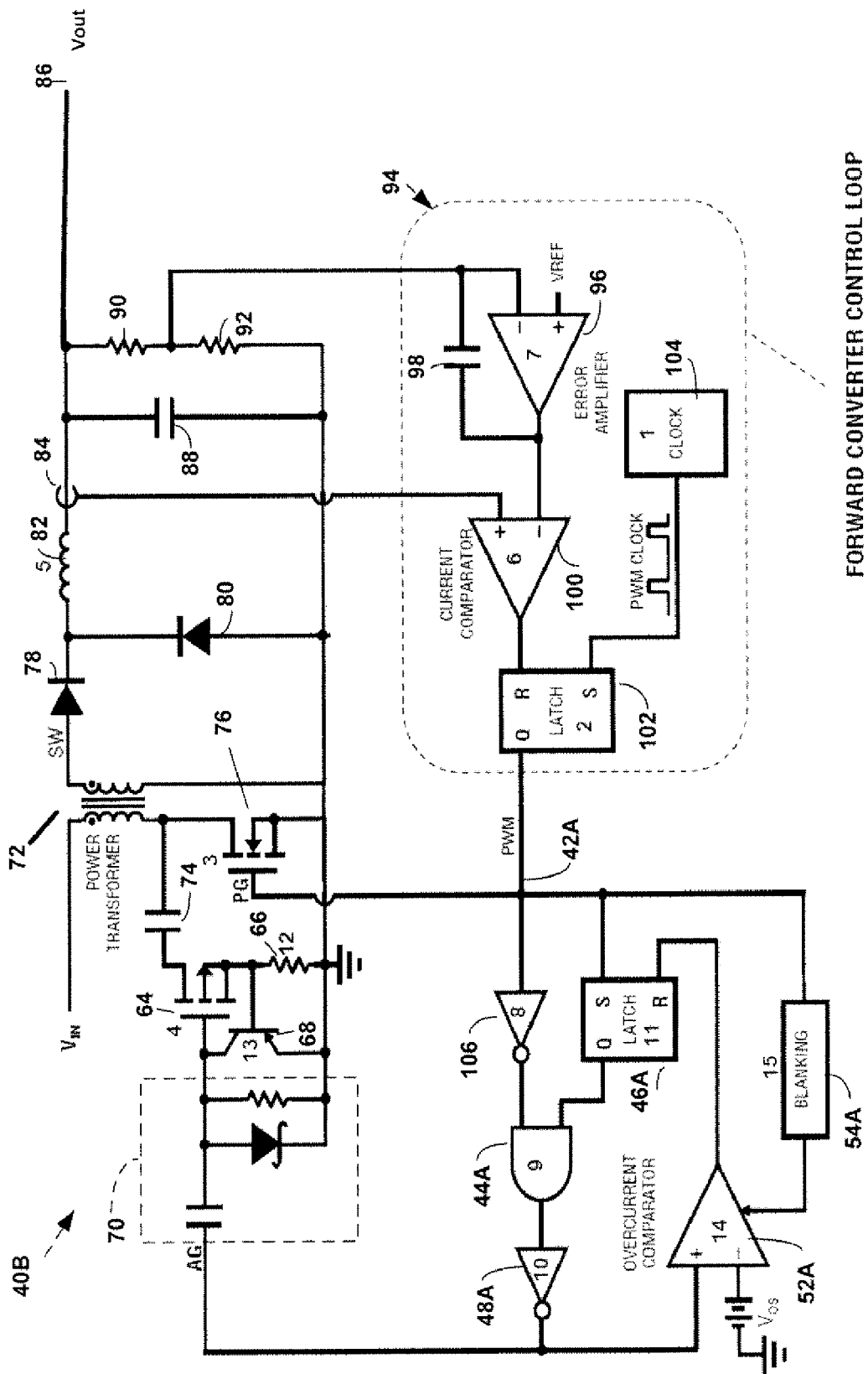

FIG. 5 is a partial schematic, partial block diagram of a third embodiment for providing overcurrent protection when connecting a DC/DC converter to a MOSFET eliminating the need for dedicated pins for making an external connection; and FIG. 6 is a partial schematic, partial block diagram of a more detailed exemplary embodiment a DC/DC converter incorporating the embodiment of FIG. 5 for connecting the converter to a MOSFET for eliminating the need for dedicated pins for making the external connection.

DETAILED DESCRIPTION OF THE DRAWINGS

Figure 3:
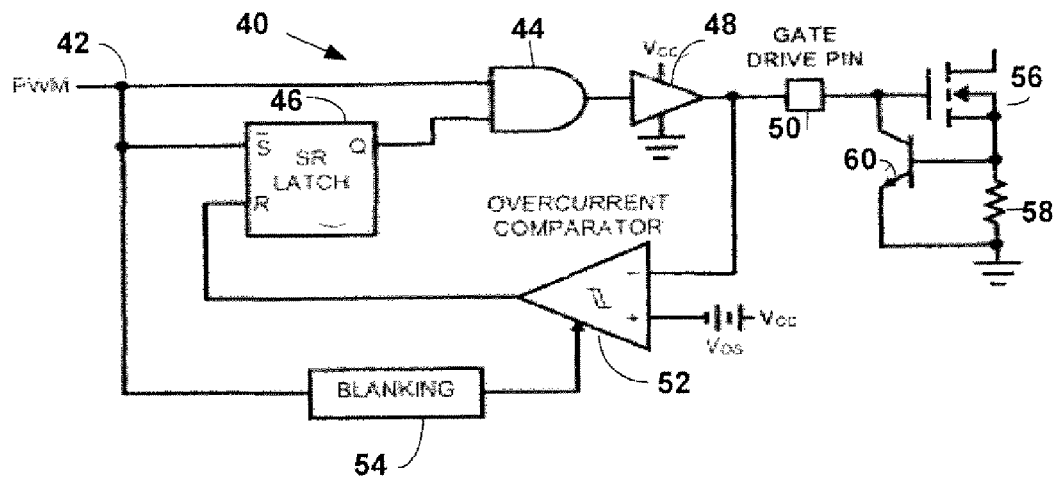
FIG. 3 is a partial schematic, partial block diagram of one embodiment for providing overcurrent protection when connecting a DC/DC converter to a MOSFET eliminating the need for dedicated pins for making an external connection.
Figure 4:
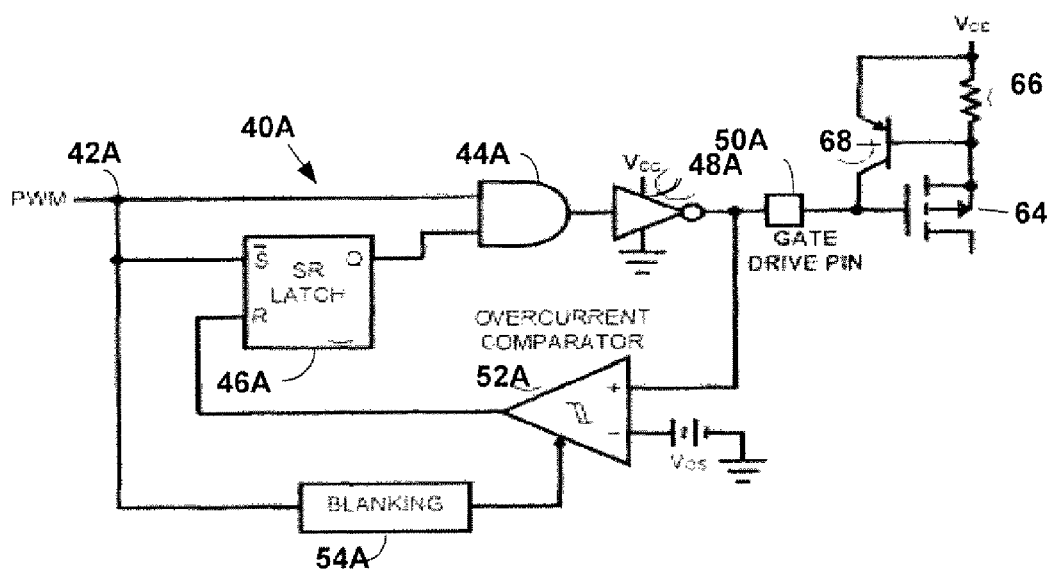
FIG. 4 is a partial schematic, partial block diagram of a second embodiment for providing overcurrent protection when connecting a DC/DC converter to a MOSFET eliminating the need for dedicated pins for making an external connection.

Illustrative embodiments are now discussed. Other embodiments may be used in addition or instead. Details that may be apparent or unnecessary may be omitted ensure conciseness or for a more effective presentation. Conversely, some embodiments may be practiced without all of the details that are disclosed. In FIGS. 3-5, only a portion of each DC/DC converter is illustrated in order to simplify exposition of the various disclosed embodiments.

One embodiment is shown in FIG. 3. In this embodiment the converter 40 receives a pulse width modulated signal at node 42 which is applied to an input of AND gate 44 and the S⁻ input of latch 46. The Q output of latch 46 is connected to a second input of AND gate 44. The output of AND gate 44 is connected to an input of output stage 48, which as described below includes a P-channel MOSFET (not specifically shown). The output of stage 48 is connected to the pin 50 and to an inverting input of overcurrent comparator 52, which in turn has its non-inverting input connected to receive an internal reference signal $V_{OS}-V_{CC}$ and its output connect is connected the R input of latch 46. Finally node 42 is connected to the blanking circuit 54, which in turn is connected to the comparator 52.

In the example shown in FIG. 3, converter 40 is connected through the pin 50 to the gate of an external N-channel MOSFET 56, which provision is made to protect from an overcurrent condition. Specifically, the source of MOSFET 56 is connected to external sense resistor 58, and is also to the base of NPN (bipolar) transistor 60. The collector of NPN transistor 60 is connected to the gate of MOSFET 56, while the emitter of transistor 60 is connected to sense resistor 58 at system ground. As configured, current that flows through the external N-Channel MOSFET 56 also flows through the external sense resistor 58. This creates a voltage between the base and emitter of NPN transistor 60. When this voltage reaches approximately 0.7V (a first threshold), NPN transistor 60 turns on and pulls a current Ic out of the gate drive output stage 48. Output stage 48 is held to Vcc by a P-Channel MOSFET (not shown) which has a known ON-resistance, $R_{DS(ON)}$. The current Ic flowing through this P-channel MOSFET ON-resistance creates a voltage on the inverting input of comparator 52 equal to $Vcc-Ic*R_{DS(ON)}$. Comparator 52 compares this voltage to the internal reference voltage (a second threshold) on its non-inverting input, Vcc–Vos. When $I_C*R_{DS(ON)}$ exceeds Vos, the output of the comparator goes high which trips latch 46, causing the Q output of the latch 46 low, resulting in the output of AND gate low. This results in latching the gate drive output of stage 48 low until the next PWM cycle. The blanking circuit 54 keeps the comparator in an untripped state during gate drive transitions to avoid false trips due to noise.

The single pin approach can be extended to protecting a P-Channel MOSFET 64 gate driver as shown in FIG. 4. In this case the source is connected to sense resistor 66, which in turn is connected to voltage source Vcc. NPN transistor 60 has been replaced with a PNP (bipolar) transistor 68. Specifically, PNP transistor 68 has it collector connected to the pin 50A and gate of MOSFET 64. The base of PNP transistor 68 is connected to the source of MOSFET 64 and sense resistor 66. Finally, the emitter of PNP transistor 68 is connected to the voltage source Vcc and the resistor 66. In this case the gate drive output of output stage 48A is inverted as shown, so that it is low when the P-Channel MOSFET 64 is "ON." The overcurrent comparator 52A is now referenced to ground instead of Vcc. This circuit operates similarly to the circuit of FIG. 3. Specifically, current that is flowing through the external P-Channel MOSFET 64 also flows through the sense resistor 66. This creates a voltage between the emitter and base of PNP transistor 68. When this voltage reaches approximately 0.7V, the PNP transistor 68 turns on and pushes a current Ic into the gate drive output stage 48A. Output stage 48A is held at system ground by a N-Channel MOSFET (not shown) which has a known on-resistance, $R_{DS(ON)}$. The current Ic flowing through the N-channel MOSFET on-resistance creates a voltage on the non-inverting input of comparator 52A equal to $I_C*R_{DS(ON)}$. Overcurrent comparator 52A compares this voltage to the voltage on its inverting input, Vos. When $I_C*R_{DS(ON)}$ exceeds Vos, the output of comparator 52A goes high which trips latch 46A, latching the gate drive output at pin 50A low until the next PWM cycle. Blanking circuit 54A keeps the comparator 52A in an untripped state during switch transitions to avoid false trips due to noise.

The teachings provided in this disclosure can be extended to other types of MOSFET configurations. For example, as shown in FIG. 5, the teachings are extended to a level-shift MOSFET 64. Specifically a level-shift network in configured between the pin 50A and the gate of the MOSFET 64. The level-shift network 70 includes a capacitor 72 connected between pin 50A gate of MOSFET 64 and the collector of bipolar transistor 68. A resistor 74 and the anode of Schottky diode 76 are each connected at the node formed by the capacitor 72, the collector of transistor 68 and the gate of MOSFET 64. The resistor 74 and the cathode of Schottky diode 76 references the P-Channel MOSFET to a voltage Vx, which may be higher or lower than Vcc. This level-shift network is widely used in forward converters with active clamp reset, where the voltage Vx is commonly connected to ground.

The circuit in FIG. 5 operates as follows: The resistor and diode in network 70 establish a reference voltage point Vx for the MOSFET 64. When the gate drive output at pin 50A switches from Vcc to ground, the gate of the MOSFET 64 is capacitively pulled low by the level-shift network 70, to a voltage of approximately equal to Vx−Vcc, turning on the MOSFET 64. The rest of the operation of this circuit is identical to that of FIG. 4, with the exception that the current Ic from the PNP transistor 68 is now capacitively coupled to the gate drive at pin 50A through the same level-shift network 70. Note that the Vx voltage can be arbitrarily high or low and is limited only by the voltage rating of the level-shift capacitor 72 in network 70.

For a more complete understanding of the implementation of the teachings described herein, FIG. 6 is a more complete diagram of an embodiment of a DC/DC converter 40B incorporating the configuration described in connection with FIG. 5. In the illustrated embodiment, Vin provides voltage to the primary winding of a power transformer 72 which is connected through capacitor 74 to the drain of MOSFET 64. The primary winding of the transformer 72 is also applied to the drain of MOSFET 76. MOSFET 76 has its gate connected to the pulse-width modulated control signal (PWM) and its source connected to the system ground. The secondary winding of a power transformer 72 is connected to the anode of diode 78, which in turn has its cathode connected to the cathode of diode 80 and the inductor 82. The anode of diode 80 is connected to system ground, while the inductor 82 is connected to the output 86 of the converter 40B. The output 86 is also connected through capacitor 88 to system ground, and to the voltage divider formed by resistors 90 and 92. The junction formed by resistors 90 and 92 provides the voltage input to the forward converter control loop 94, and specifically to the inverting input of error amplifier 96 (having feedback capacitor 98 connected between the inverting input and output of the amplifier. The out of error amplifier 96 is connected to the inverting input of the current comparator 100. The output at 86 is sensed with current monitor 84, and applied to the non-inverting input of the current comparator 100. The output of comparator 100 is applied to the R input of latch 102, while a clocking input PWM Clock is provided by the clock 104 to the S input of the latch 102. The Q output of latch 102 provides the output PWM of the control loop 94 at node 42A. For reasons which will be more evident below, the node is connected to an inverter 106, which in turn provides an input to the AND gate 44A.

In operation when the PWM Clock from clock 104 goes high, the latch 102 is set and PWM signal at node 42A goes high. This turns off AG (active gate) of the MOSFET 64, and turns on PG (primary gate) of MOSFET 76. With PG of MOSFET 76 on, the switch node (SW) on the secondary winding of power transformer 72 goes high and the current in the inductor 82 ramps linearly. The current increases until the current comparator 100 trips and resets the latch 102. The threshold of the current comparator 100 is established by error amplifier 96, which integrates the error between the output voltage Vout and a reference voltage VREF. For example, if the output voltage is too low, the error amplifier 96 increases the peak current threshold to increase the current which brings it back up. After the current comparator 100 trips, the PWM latch 102 is reset and the PWM signal at node 42A goes low. The PG of MOSFET 76 is turned off and the AG of MOSFET 64 is turned on. The AG of MOSFET 64 is necessary to reset the transformer core of transformer 72, which is a necessity in forward converters. The use of the current protection circuit shown in FIG. 6 is used to protect the active gate of MOSFET 64 from excessive currents seen during transient conditions (line step, load step, etc).

The overprotection circuit works as follows: when the PWM signal at node 42A is high, the output of inverter 106 is low, which forces the output of AND gate 44A low, and, through inverter 48A, makes the AG of MOSFET 64 go high.

This turns off the AG of MOSFET 64. At this point, the output Q of latch 46A is high. When the PWM signal at node 42A goes low, the output of latch 102 remains high. The output of inverter 106 goes high, and the output of AND gate 44A goes high. Inverter 48A makes AG of MOSFET 64 go low, which turns on the AG MOSFET 64.

If the current in P-channel MOSFET 64, which flows through sense resistor 66 is high enough to turn on the PNP transistor 68, it will push current back into inverter 48A. If the voltage on the output of inverter 48A exceeds the $V_{OS}$ offset voltage of comparator 52A, then the output of comparator 52A will go high and reset latch 46A. This in turn makes the AG signal on the MOSFET 64 go high which turns off the P-channel MOSFET. Blanking circuit 54A keeps the comparator 52A from tripping on noise during transitions. The blanking circuit 54A does not enable comparator 52A until some time delay after PWM at node 42A goes low (typically 200 ns, although this time delay can vary).

As described the arrangements described in connection with FIGS. 3-5 embodiments have the following advantages:

No extra pins are required to sense the current, which saves IC package area and cost.

Figure 1:
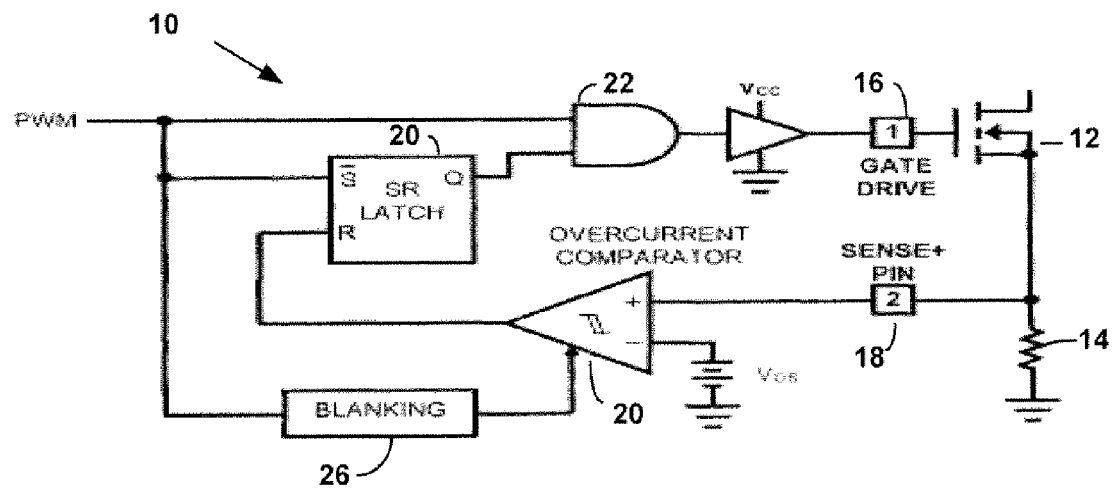
FIG. 1 is a partial schematic, partial block diagram of a prior art approach to providing overcurrent protection when connecting a DC/DC converter to a MOSFET, requiring one dedicated pin for making an external connection.
Figure 2:
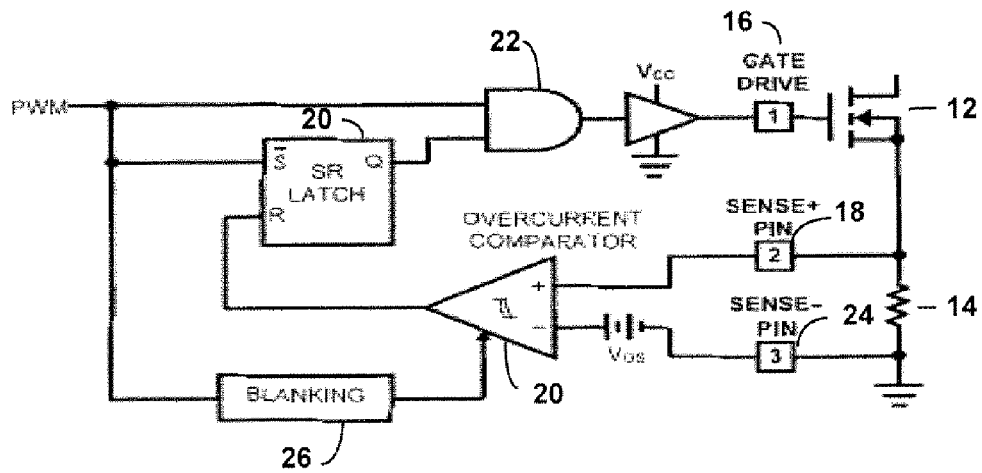
FIG. 2 is a partial schematic, partial block diagram of a prior art approach to providing overcurrent protection when connecting a DC/DC converter to a MOSFET, requiring two dedicated pins for making an external connection.

The overcurrent signal is generated at the source, eliminating the offset due to trace routing that can occur with a single-ended overcurrent comparator of FIG. 1. Additionally, the NPN or PNP transistor gain element of transistors 60 and 68 in combination with the low output impedance of the gate driver gives the overcurrent monitor high noise immunity.

Unlike the prior art, the arrangements in which the dedicated pins for sensing the load current are not limited to the input range of the overcurrent comparator. As shown in FIG. 5, the overcurrent monitor can be extended to an arbitrary voltage Vx with minimal limitation.

Thus, the teachings described herein address three significant problems with the prior art overcurrent monitor implementations. It does not require any extra pins for implementation, is less prone to error from noise coupling and trace resistance, and can be extended to an arbitrary voltage range.

The components, steps, features, benefits and advantages that have been discussed are merely illustrative. None of them, nor the discussions relating to them, are intended to limit the scope of protection in any way. Numerous other embodiments are also contemplated.

Additionally, embodiments of the present disclosure can have fewer, additional, and/or different components, steps, features, benefits and advantages than as expressly described herein. These also include embodiments in which the components and/or steps are arranged and/or ordered differently.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications which have been cited in this disclosure are hereby incorporated herein by reference.

The phrase "means for" when used in a claim is intended to and should be interpreted to embrace the corresponding structures and materials that have been described and their equivalents. Similarly, the phrase "step for" when used in a claim embraces the corresponding acts that have been described and their equivalents. The absence of these phrases means that the claim is not intended to and should not be interpreted to be limited to any of the corresponding structures, materials, or acts or to their equivalents.

Nothing that has been stated or illustrated is intended or should be interpreted to cause a dedication of any component, step, feature, object, benefit, advantage, or equivalent to the public, regardless of whether it is recited in the claims.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents.

What is claimed is:

1. A DC/DC converter for providing a pulse width modulated signal output signal to the gate of a MOSFET switch, the converter comprising:
an output configured to be coupled to the gate of the MOSFET switch; and
a control configured so as to sense a current generated at the output when the current through the MOSFET switch exceeds a first threshold level, and disabling the pulse width modulated output signal until the next cycle of the signal when the sensed output current exceeds a second threshold level.

2. The DC/DC converter according to claim 1, wherein the first threshold is a function of current flowing in the MOSFET.

3. The DC/DC converter according to claim 2, further including a sense resistor external to the converter and coupled to the MOSFET so that current flowing through the MOSFET flows through the sense resistor, and a bipolar transistor external to the converter and coupled to the MOSFET and sense resistor so that when the current flowing through the switch exceeds the first threshold level, the bipolar switch turns on so as to draw current at the output of the DC/DC converter.

4. The DC/DC converter according to claim 3, wherein the control includes a comparator configured to generate a disabling signal when the current drawn from the output of the DC/DC converter exceeds the second threshold level.

5. The DC/DC converter according to claim 3, wherein MOSFET is an N-channel MOSFET, the bipolar transistor is an NPN transistor, and the sense resistor is coupled to system ground.

6. The DC/DC converter according to claim 3, wherein MOSFET is a P-channel MOSFET, the bipolar transistor is a PNP transistor, and the sense resistor is coupled to a voltage source.

7. A DC/DC converter according to claim 6, further including coupling a level shift network between the output of the DC/DC converter to the MOSFET switch.

8. A DC/DC converter according to claim 1, further including a blanking circuit configured so as to prevent the control from disabling the pulse width modulated output signal during transitions of the pulse width modulated signal.

9. A method of protecting a MOSFET switch coupled to the pulse width modulated output of a DC/DC converter from an overcurrent condition, the method comprising:
coupling the MOSFET switch to a sense resistor so that current flowing though the MOSFET switch also flows through the sense resistor;
coupling a bipolar transistor to the MOSFET switch and the sense resistor so that current through the sense resistor biases the bipolar transistor so that when the when the current through the sense resistor exceeds a first threshold level, the bipolar transistor turns on so as to draw current from the output of the DC/DC converter; and
disabling the output of the DC/DC converter until the next cycle of the pulse width modulated output when the current drawn from the output of the DC/DC converter exceeds a second threshold level.

10. A method according to claim 9, wherein MOSFET is an N-channel MOSFET, the bipolar transistor is an NPN transistor, and the method includes coupling the sense resistor to system ground.

11. A method according to claim 9, wherein the MOSFET is a P-channel MOSFET, the bipolar transistor is a PNP transistor, and the method includes coupling the sense resistor to a voltage source.

12. A method according to claim 9, further including coupling a level shift network between the output of the DC/DC converter to the MOSFET switch.

13. A method according to claim 9, wherein during operation the output of the DC/DC converter is a pulse width modulated signal, the method further including preventing the disabling step from occurring during transitions of the pulse width modulated signal.

* * * * *

UNITED STATES PATENT AND TRADEMARK OFFICE
CERTIFICATE OF CORRECTION

PATENT NO.        : 8,345,391 B2                                       Page 1 of 1
APPLICATION NO.   : 12/883876
DATED             : January 1, 2013
INVENTOR(S)       : William Hall Coley et al.

It is certified that error appears in the above-identified patent and that said Letters Patent is hereby corrected as shown below:

On the title page item (75) Second Inventor's last name should read --Mathews-- rather than Matthews.

Signed and Sealed this
Tenth Day of September, 2013

Teresa Stanek Rea
*Acting Director of the United States Patent and Trademark Office*